United States Patent
Shih (10) Patent No.: US 9,752,022 B2
(45) Date of Patent: Sep. 5, 2017

(54) COMPOSITION, FILM AND RELATED METHODS

(75) Inventor: Frank Y. Shih, Arcadia, CA (US)

(73) Assignee: Avery Dennison Corporation, Glendale, CA (US)

( * ) Notice: Subject to any disclaimer, the term of this patent is extended or adjusted under 35 U.S.C. 154(b) by 1306 days.

(21) Appl. No.: 12/323,788

(22) Filed: Nov. 26, 2008

(65) Prior Publication Data

US 2010/0009108 A1 Jan. 14, 2010

Related U.S. Application Data

(63) Continuation-in-part of application No. PCT/US2008/069706, filed on Jul. 10, 2008.

(51) Int. Cl.
| | |
|---|---|
| C08L 25/08 | (2006.01) |
| C08L 23/08 | (2006.01) |
| B32B 27/20 | (2006.01) |
| B41M 5/52 | (2006.01) |
| B32B 27/30 | (2006.01) |
| B32B 9/04 | (2006.01) |
| B05D 5/04 | (2006.01) |
| B41M 5/50 | (2006.01) |
| B32B 27/08 | (2006.01) |
| C08L 31/04 | (2006.01) |
| C08L 75/04 | (2006.01) |
| C09D 131/04 | (2006.01) |
| C08K 3/22 | (2006.01) |
| C08L 29/04 | (2006.01) |
| C08L 33/06 | (2006.01) |
| C08L 33/08 | (2006.01) |

(52) U.S. Cl.
CPC ............ *C08L 23/0853* (2013.01); *B05D 5/04* (2013.01); *B32B 9/045* (2013.01); *B32B 27/08* (2013.01); *B32B 27/20* (2013.01); *B32B 27/306* (2013.01); *B41M 5/502* (2013.01); *B41M 5/52* (2013.01); *C08L 31/04* (2013.01); *C08L 75/04* (2013.01); *C09D 131/04* (2013.01); *B05D 2601/00* (2013.01); *B05D 2601/24* (2013.01); *C08K 3/22* (2013.01); *C08L 29/04* (2013.01); *C08L 33/06* (2013.01); *C08L 33/08* (2013.01); *Y10T 428/1452* (2015.01); *Y10T 428/31554* (2015.04); *Y10T 428/31565* (2015.04); *Y10T 428/31786* (2015.04); *Y10T 428/31794* (2015.04)

(58) Field of Classification Search
CPC ... C08L 23/0853; C08L 31/04; C09D 131/04; B41B 5/502; B41B 5/52; B05D 5/04; B05D 2601/00; B05D 2601/24; B32B 9/045; B32B 27/08; B32B 27/20; B32B 27/306

See application file for complete search history.

(56) References Cited

U.S. PATENT DOCUMENTS

| | | | |
|---|---|---|---|
| 3,351,573 A | 11/1967 | Skreckoski | |
| 3,684,758 A | 8/1972 | Honig et al. | |
| 3,843,478 A | 10/1974 | Zuscik et al. | |
| 3,870,521 A | 3/1975 | Mackey et al. | |
| 4,069,186 A | 1/1978 | Ramig | |
| 4,108,819 A * | 8/1978 | Oyamada | C08L 63/00 156/330 |
| 4,198,330 A | 4/1980 | Kaizerman et al. | |
| 4,416,749 A | 11/1983 | Mahr et al. | |
| 4,436,520 A | 3/1984 | Lipko et al. | |
| 4,532,189 A | 7/1985 | Mueller | |
| 4,644,030 A | 2/1987 | Loewrigkeit et al. | |
| 4,935,470 A | 6/1990 | Tanuma et al. | |
| 4,983,461 A | 1/1991 | Daude et al. | |
| 4,983,662 A | 1/1991 | Overbeek et al. | |
| 5,030,505 A | 7/1991 | Dickinson | |
| 5,041,517 A | 8/1991 | Vu et al. | |
| 5,051,295 A | 9/1991 | Mori et al. | |
| 5,060,981 A | 10/1991 | Fossum et al. | |
| 5,102,737 A | 4/1992 | Josephy et al. | |
| 5,104,928 A | 4/1992 | Craun et al. | |
| 5,116,442 A | 5/1992 | Daude et al. | |
| 5,120,154 A | 6/1992 | Lasch et al. | |
| 5,135,797 A | 8/1992 | Sasaki et al. | |
| 5,254,394 A | 10/1993 | Bothe et al. | |
| 5,306,374 A | 4/1994 | Hambright | |
| 5,314,713 A | 5/1994 | Mori et al. | |
| 5,324,467 A | 6/1994 | Anderson, II | |
| 2,364,435 A | 12/1994 | Foster et al. | |

(Continued)

FOREIGN PATENT DOCUMENTS

| | | |
|---|---|---|
| CN | 1090032 | 9/2002 |
| CN | 100381530 | 4/2008 |

(Continued)

OTHER PUBLICATIONS

Invitation to Pay Additional Fees and Partial International Search Report issued in PCT/US08/069706 dated Oct. 30, 2008.
SAE Technical Standard J1960 (Rev. Oct. 2004).
Griffin, G.J.L., "Biodegradation of ethylene/vinylacetate copolymers," Proceedings of 3rd International Biodegradation Symposium, pp. 807-813, 1975.
International Search Report and the Written Opinion of the International Searching Authority issued in PCT/US2008/069706 dated Feb. 19, 2009.
Invitation to Pay Additional Fees and Partial International Search Report issued in PCT/US2008/084812 dated Mar. 20, 2009.

(Continued)

*Primary Examiner* — Peter D Mulcahy
(74) *Attorney, Agent, or Firm* — Avery Dennison Corporation (57) ABSTRACT

A composition that is configured for use in creating a film. The composition includes a vinyl acetate containing polymer, such as a vinyl acetate ethylene (VAE) copolymer, and at least one additive that is a pigment, a surfactant, a dispersant, a wetting agent, a plasticizer, a defoamer, a coupling agent, a solvent, a UV absorber, a fire retardant, or a light stabilizer.

31 Claims, 2 Drawing Sheets

(56) References Cited

U.S. PATENT DOCUMENTS

| | | | |
|---|---|---|---|
| 5,376,430 A | 12/1994 | Swenson et al. |
| 5,420,195 A | 5/1995 | Mayer et al. |
| 5,422,189 A | 6/1995 | Warner et al. |
| 5,436,073 A | 7/1995 | Williams et al. |
| 5,468,532 A | 11/1995 | Ho et al. |
| 5,480,705 A | 1/1996 | Tolliver et al. |
| 5,486,426 A | 1/1996 | McGee et al. |
| 5,494,980 A | 2/1996 | Buter et al. |
| 5,508,105 A | 4/1996 | Orensteen et al. |
| 5,558,913 A | 9/1996 | Sasaki et al. |
| 5,562,962 A | 10/1996 | Tung |
| 5,567,761 A | 10/1996 | Song |
| 5,571,861 A | 11/1996 | Klein et al. |
| 5,578,669 A | 11/1996 | Odawa et al. |
| 5,585,193 A | 12/1996 | Josephy et al. |
| 5,593,785 A | 1/1997 | Mayo et al. |
| 5,594,065 A | 1/1997 | Tien et al. |
| 5,612,107 A | 3/1997 | Sangani et al. |
| 5,623,016 A | 4/1997 | Klein et al. |
| 5,643,669 A | 7/1997 | Tsuei |
| 5,662,997 A | 9/1997 | Onishi et al. |
| 5,672,413 A | 9/1997 | Taylor et al. |
| 5,688,573 A | 11/1997 | Goeb et al. |
| 5,691,425 A | 11/1997 | Klein et al. |
| 5,700,582 A | 12/1997 | Sargeant et al. |
| 5,702,790 A | 12/1997 | Liebe et al. |
| 5,712,044 A | 1/1998 | Fanselow et al. |
| 5,721,086 A | 2/1998 | Emslander et al. |
| 5,728,430 A | 3/1998 | Sartor et al. |
| 5,755,929 A | 5/1998 | Kuroyama et al. |
| 5,766,744 A | 6/1998 | Fanselow et al. |
| 5,783,303 A | 7/1998 | Tsuei |
| 5,789,123 A | 8/1998 | Cleckner et al. |
| 5,837,375 A | 11/1998 | Brault et al. |
| 5,849,419 A | 12/1998 | Josephy et al. |
| 5,853,899 A | 12/1998 | Anderson et al. |
| 5,856,010 A | 1/1999 | Furuya et al. |
| 5,866,248 A | 2/1999 | Dressler |
| 5,882,388 A | 3/1999 | Adair et al. |
| 5,888,615 A | 3/1999 | Mascarenhas et al. |
| 5,888,635 A | 3/1999 | Yang et al. |
| 5,902,673 A | 5/1999 | Missell et al. |
| 5,955,512 A | 9/1999 | Numazawa et al. |
| 5,981,045 A | 11/1999 | Kuwabara et al. |
| 6,001,916 A | 12/1999 | Walker et al. |
| 6,022,925 A | 2/2000 | Tomko et al. |
| 6,025,068 A | 2/2000 | Pekala |
| 6,031,041 A | 2/2000 | Chung et al. |
| 6,033,514 A | 3/2000 | Davis et al. |
| 6,040,035 A | 3/2000 | Satoh et al. |
| 6,045,648 A | 4/2000 | Palmgren et al. |
| 6,045,920 A | 4/2000 | Ou-Yang et al. |
| 6,063,858 A | 5/2000 | Daniels et al. |
| 6,074,747 A | 6/2000 | Scholz et al. |
| 6,087,001 A | 7/2000 | Jacquemet et al. |
| 6,093,451 A | 7/2000 | Sandlin et al. |
| 6,096,425 A | 8/2000 | Smith |
| 6,106,982 A | 8/2000 | Mientus et al. |
| 6,110,570 A | 8/2000 | Paleari et al. |
| 6,114,021 A | 9/2000 | Pankratz et al. |
| 6,132,858 A | 10/2000 | Kloos |
| 6,143,408 A | 11/2000 | Fujita |
| 6,146,770 A | 11/2000 | Sargeant et al. |
| 6,150,013 A | 11/2000 | Balaji et al. |
| 6,152,115 A | 11/2000 | Busato et al. |
| 6,156,403 A | 12/2000 | Cochran |
| 6,159,605 A | 12/2000 | Hanada et al. |
| 6,165,593 A | 12/2000 | Brault et al. |
| 6,171,681 B1 | 1/2001 | Mascarenhas et al. |
| 6,177,187 B1 | 1/2001 | Niemoller et al. |
| 6,194,061 B1 | 2/2001 | Satoh et al. |
| 6,207,361 B1 | 3/2001 | Greener et al. |
| 6,218,455 B1 * | 4/2001 | Smith ............... C08F 2/26 524/457 |
| 6,225,381 B1 | 5/2001 | Sharma et al. |
| 6,228,486 B1 | 5/2001 | Kittel et al. |
| 6,239,209 B1 | 5/2001 | Yang et al. |
| 6,258,441 B1 | 7/2001 | Oguchi et al. |
| 6,261,670 B1 | 7/2001 | Hakomori et al. |
| 6,270,912 B1 | 8/2001 | Peet |
| 6,280,027 B1 | 8/2001 | Lawrence et al. |
| 6,316,120 B1 | 11/2001 | Emslander |
| 6,329,060 B1 | 12/2001 | Barkac et al. |
| 6,355,345 B1 | 3/2002 | Furuya et al. |
| 6,358,660 B1 | 3/2002 | Agler et al. |
| 6,379,813 B1 | 4/2002 | Anderson et al. |
| 6,383,644 B2 | 5/2002 | Fuchs |
| 6,391,415 B1 | 5/2002 | McCurry et al. |
| 6,395,209 B2 | 5/2002 | Yoshida et al. |
| 6,403,202 B2 | 6/2002 | Gu et al. |
| 6,410,200 B1 | 6/2002 | Williams et al. |
| 6,428,895 B1 | 8/2002 | Reihs et al. |
| 6,436,496 B1 | 8/2002 | Rackovan et al. |
| 6,447,883 B1 | 9/2002 | Chen et al. |
| 6,461,706 B1 | 10/2002 | Freedman et al. |
| 6,461,722 B1 | 10/2002 | Kittel et al. |
| 6,495,628 B1 | 12/2002 | Origuchi et al. |
| 6,509,075 B1 | 1/2003 | McCurry et al. |
| 6,509,097 B1 | 1/2003 | Hatakeyama et al. |
| 6,521,325 B1 | 2/2003 | Engle et al. |
| 6,531,216 B1 | 3/2003 | Williams et al. |
| 6,541,101 B1 | 4/2003 | Cook et al. |
| 6,552,115 B1 | 4/2003 | Zecha et al. |
| 6,555,213 B1 | 4/2003 | Koneripalli et al. |
| 6,555,240 B1 | 4/2003 | Nishikori et al. |
| 6,566,024 B1 | 5/2003 | Bourdelais et al. |
| 6,573,011 B1 | 6/2003 | Nair et al. |
| 6,589,636 B2 | 7/2003 | Emslander et al. |
| 6,592,700 B2 | 7/2003 | Wang et al. |
| 6,599,593 B1 | 7/2003 | Niu et al. |
| 6,617,008 B1 | 9/2003 | Kono et al. |
| 6,630,049 B2 | 10/2003 | Hannington et al. |
| 6,632,485 B1 | 10/2003 | Tang et al. |
| 6,641,879 B1 | 11/2003 | Matsuura et al. |
| 6,649,260 B2 | 11/2003 | Kumano et al. |
| 6,663,947 B2 | 12/2003 | Freedman et al. |
| 6,667,093 B2 | 12/2003 | Yuan et al. |
| 6,673,453 B2 | 1/2004 | Beavers et al. |
| 6,713,166 B2 | 3/2004 | Yamamoto |
| 6,723,433 B2 | 4/2004 | Bacon, Jr. |
| 6,723,773 B2 | 4/2004 | Williams et al. |
| 6,726,969 B1 | 4/2004 | Balaji et al. |
| 6,726,981 B2 | 4/2004 | Steinbeck et al. |
| 6,740,465 B2 | 5/2004 | Liang et al. |
| 6,743,523 B1 | 6/2004 | Woo et al. |
| 6,755,350 B2 | 6/2004 | Rochford et al. |
| 6,759,121 B2 | 7/2004 | Alahapperuma et al. |
| 6,761,969 B2 | 7/2004 | Li et al. |
| 6,773,804 B2 | 8/2004 | Enlow et al. |
| 6,786,994 B2 | 9/2004 | Williams et al. |
| 6,790,491 B2 | 9/2004 | Sebastian et al. |
| 6,790,516 B2 | 9/2004 | Niepelt |
| 6,793,859 B2 | 9/2004 | Emslander et al. |
| 6,793,860 B2 | 9/2004 | Xing et al. |
| 6,794,466 B2 | 9/2004 | Zecha et al. |
| 6,800,341 B2 | 10/2004 | Emslander et al. |
| 6,808,822 B2 | 10/2004 | Rajan et al. |
| 6,811,857 B1 | 11/2004 | Bravet et al. |
| 6,821,583 B2 | 11/2004 | Shouldice et al. |
| 6,830,803 B2 | 12/2004 | Vaidya et al. |
| 6,841,204 B2 | 1/2005 | Nakamura et al. |
| 6,846,075 B2 | 1/2005 | Ylitalo et al. |
| 6,846,524 B2 | 1/2005 | Ozawa et al. |
| 6,857,737 B2 | 2/2005 | Emslander et al. |
| 6,866,383 B2 | 3/2005 | Naik et al. |
| 6,866,904 B2 | 3/2005 | Nellis et al. |
| 6,875,487 B2 | 4/2005 | Williams et al. |
| 6,881,458 B2 | 4/2005 | Ludwig et al. |
| 6,881,704 B2 | 4/2005 | Sakamoto et al. |
| 6,896,944 B2 | 5/2005 | Ylitalo et al. |
| 6,911,239 B2 | 6/2005 | King et al. |
| 6,919,113 B2 | 7/2005 | Therrian et al. |
| 6,953,624 B2 | 10/2005 | Bacon, Jr. |
| 6,986,919 B2 | 1/2006 | Hladik et al. |

(56) References Cited

U.S. PATENT DOCUMENTS

| | | |
|---|---|---|
| 6,989,192 B2 | 1/2006 | Husemann et al. |
| 6,989,418 B2 | 1/2006 | Ko et al. |
| 6,989,715 B2 | 1/2006 | Yin |
| 7,014,910 B2 | 3/2006 | Rochford et al. |
| 7,022,385 B1 | 4/2006 | Nasser |
| 7,025,453 B2 | 4/2006 | Ylitalo et al. |
| 7,045,199 B2 | 5/2006 | Yamamoto et al. |
| 7,097,298 B2 | 8/2006 | Sondergeld et al. |
| 7,147,923 B2 | 12/2006 | Roberts et al. |
| 7,157,133 B2 | 1/2007 | Moran |
| 7,166,156 B2 | 1/2007 | Parrinello et al. |
| 7,166,649 B2 | 1/2007 | Day et al. |
| 7,179,521 B2 | 2/2007 | Arthurs et al. |
| 7,205,029 B2 | 4/2007 | Ohrbom et al. |
| 7,223,468 B2 | 5/2007 | Yamamoto et al. |
| 7,291,372 B2 | 11/2007 | Otsuki et al. |
| 7,326,462 B2 | 2/2008 | Ishiguro et al. |
| 7,332,205 B2 | 2/2008 | Hannington et al. |
| 7,344,618 B2 | 3/2008 | Hannington et al. |
| 7,358,295 B2 | 4/2008 | Miller et al. |
| 7,371,465 B2 | 5/2008 | Pellingra et al. |
| 7,384,672 B2 * | 6/2008 | Chang et al. |
| 7,402,341 B2 | 7/2008 | Halahmi |
| 7,410,692 B2 | 8/2008 | Koda et al. |
| 7,476,705 B2 | 1/2009 | Pajerski |
| 7,534,479 B2 | 5/2009 | Utz et al. |
| 7,569,272 B2 | 8/2009 | Ohrui et al. |
| 7,582,698 B2 | 9/2009 | Lubnin et al. |
| 7,641,947 B2 | 1/2010 | Chen et al. |
| 7,655,296 B2 | 2/2010 | Haas et al. |
| 7,678,959 B2 | 3/2010 | Okada et al. |
| 7,691,784 B2 | 4/2010 | Yuki et al. |
| 7,691,948 B2 | 4/2010 | Takamatsu et al. |
| 7,700,188 B2 | 4/2010 | Balaji et al. |
| 7,799,851 B2 | 9/2010 | Hladik et al. |
| 7,872,069 B2 | 1/2011 | Xia et al. |
| 7,906,218 B2 | 3/2011 | Steichen et al. |
| 7,910,519 B2 | 3/2011 | Majumdar et al. |
| 7,935,398 B2 | 5/2011 | Park et al. |
| 7,951,457 B2 | 5/2011 | Casteren Van et al. |
| 7,968,183 B2 | 6/2011 | Takada et al. |
| 7,972,681 B2 | 7/2011 | Roys et al. |
| 8,003,176 B2 | 8/2011 | Ylitalo et al. |
| 8,114,485 B1 | 2/2012 | Schwendimann et al. |
| 8,796,351 B2 | 8/2014 | Koch |
| 9,240,131 B2 | 1/2016 | Onderisin et al. |
| 2002/0009576 A1 | 1/2002 | Fu et al. |
| 2002/0039642 A1 | 4/2002 | Inoue et al. |
| 2002/0098327 A1 | 7/2002 | Ohta et al. |
| 2002/0146544 A1 * | 10/2002 | Kronzer ............... 428/195 |
| 2002/0164455 A1 | 11/2002 | Nishikawa et al. |
| 2002/0177669 A1 | 11/2002 | Jenny et al. |
| 2003/0049415 A1 | 3/2003 | Pedginski et al. |
| 2003/0050379 A1 * | 3/2003 | Shih et al. ............... 524/431 |
| 2003/0060574 A1 | 3/2003 | Muller et al. |
| 2003/0096087 A1 | 5/2003 | Benanati et al. |
| 2003/0099827 A1 | 5/2003 | Shih et al. |
| 2003/0121600 A1 | 7/2003 | Loncar, Jr. et al. |
| 2003/0157276 A1 | 8/2003 | Romano, Jr. |
| 2003/0170405 A1 | 9/2003 | Parrinello et al. |
| 2003/0180541 A1 | 9/2003 | Naik et al. |
| 2003/0207051 A1 | 11/2003 | Kozumi |
| 2004/0048073 A1 | 3/2004 | Bacon, Jr. |
| 2004/0058133 A1 | 3/2004 | Bilodeau |
| 2004/0076804 A1 | 4/2004 | Kijima et al. |
| 2004/0091645 A1 | 5/2004 | Heederik et al. |
| 2004/0105940 A1 | 6/2004 | Parrinello et al. |
| 2004/0105971 A1 | 6/2004 | Parrinello et al. |
| 2004/0105994 A1 | 6/2004 | Lu et al. |
| 2004/0202840 A1 | 10/2004 | Do et al. |
| 2004/0241352 A1 | 12/2004 | Shih et al. |
| 2005/0008794 A1 | 1/2005 | Graczyk et al. |
| 2005/0019508 A1 | 1/2005 | Engel et al. |
| 2005/0048303 A1 | 3/2005 | Henderson et al. |
| 2005/0084788 A1 * | 4/2005 | Yau et al. ............... 430/138 |
| 2005/0100687 A1 | 5/2005 | Dutton et al. |
| 2005/0136263 A1 | 6/2005 | Roberts et al. |
| 2005/0147807 A1 | 7/2005 | Haas et al. |
| 2005/0244657 A1 | 11/2005 | Kawamura et al. |
| 2006/0001725 A1 | 1/2006 | Nagata et al. |
| 2006/0014022 A1 | 1/2006 | Kendig et al. |
| 2006/0019073 A1 | 1/2006 | Kinley et al. |
| 2006/0160949 A1 | 7/2006 | Styranec et al. |
| 2006/0204689 A1 | 9/2006 | Tsukamoto et al. |
| 2006/0234075 A1 | 10/2006 | Watanabe |
| 2006/0263564 A1 | 11/2006 | Steyaert |
| 2006/0292317 A1 | 12/2006 | Parrinello et al. |
| 2007/0048466 A1 | 3/2007 | Huynh |
| 2007/0077421 A1 | 4/2007 | Grefenstein et al. |
| 2007/0136973 A1 | 6/2007 | Patel et al. |
| 2007/0148444 A1 | 6/2007 | Kamiya et al. |
| 2007/0172608 A1 | 7/2007 | Tojo et al. |
| 2007/0172609 A1 | 7/2007 | Williams |
| 2007/0172636 A1 | 7/2007 | Smith et al. |
| 2007/0196647 A1 | 8/2007 | Yokoyama et al. |
| 2008/0026182 A1 | 1/2008 | Abe et al. |
| 2008/0085385 A1 | 4/2008 | Ylitalo et al. |
| 2008/0166507 A1 | 7/2008 | Park et al. |
| 2008/0280111 A1 | 11/2008 | Blackwell et al. |
| 2008/0286576 A1 | 11/2008 | McGuire, Jr. et al. |
| 2008/0302470 A1 | 12/2008 | Sumita et al. |
| 2009/0017299 A1 | 1/2009 | Shimbo et al. |
| 2009/0047449 A1 | 2/2009 | Snow |
| 2009/0214837 A1 | 8/2009 | Albenice et al. |
| 2009/0233067 A1 | 9/2009 | Doornheim et al. |
| 2009/0269568 A1 | 10/2009 | Kuhlmann et al. |
| 2009/0286033 A1 | 11/2009 | Taghavi et al. |
| 2009/0297820 A1 | 12/2009 | Kovalchuk et al. |
| 2009/0317572 A1 | 12/2009 | Abe et al. |
| 2010/0009108 A1 | 1/2010 | Shih |
| 2010/0048077 A1 | 2/2010 | Ko et al. |
| 2010/0051200 A1 | 3/2010 | Mueller et al. |
| 2010/0058656 A1 | 3/2010 | Chevalier et al. |
| 2010/0065212 A1 | 3/2010 | Husemann et al. |
| 2010/0104872 A1 | 4/2010 | Lu |
| 2010/0112263 A1 | 5/2010 | Lorence et al. |
| 2010/0143615 A1 | 6/2010 | Hsu |
| 2010/0215880 A1 | 8/2010 | Chu et al. |
| 2010/0243151 A1 | 9/2010 | Stokes |
| 2011/0009561 A1 | 1/2011 | Pajerski et al. |
| 2011/0012974 A1 | 1/2011 | Niu |
| 2011/0027505 A1 | 2/2011 | Majumdar et al. |
| 2011/0033698 A1 | 2/2011 | Woods et al. |
| 2011/0033700 A1 | 2/2011 | Caylus |
| 2011/0045290 A1 | 2/2011 | Maeda et al. |
| 2011/0052843 A1 | 3/2011 | Dontula et al. |
| 2011/0064900 A1 | 3/2011 | Uesugi et al. |
| 2011/0064953 A1 | 3/2011 | O'Rourke et al. |
| 2011/0064956 A1 | 3/2011 | Casteren Van et al. |
| 2011/0077345 A1 | 3/2011 | Erdem et al. |
| 2011/0104488 A1 | 5/2011 | Mussig et al. |
| 2011/0111146 A1 | 5/2011 | Williams |
| 2011/0117296 A1 | 5/2011 | Jang et al. |
| 2011/0117299 A1 | 5/2011 | Kung et al. |
| 2011/0152439 A1 * | 6/2011 | Wu ............... C09D 131/04 524/522 |
| 2011/0200830 A1 | 8/2011 | Tennebroek et al. |
| 2011/0250368 A1 | 10/2011 | Shih et al. |
| 2012/0000591 A1 | 1/2012 | Mussig et al. |
| 2012/0088054 A1 | 4/2012 | Shih et al. |
| 2014/0242316 A1 | 8/2014 | Shih et al. |

FOREIGN PATENT DOCUMENTS

| | | |
|---|---|---|
| CN | 101368073 | 2/2009 |
| CN | 100493670 | 4/2009 |
| CN | 100569884 | 12/2009 |
| CN | 101619200 | 1/2010 |
| CN | 101812277 | 8/2010 |
| CN | 101864258 | 10/2010 |
| CN | 101434819 | 11/2010 |
| CN | 101544725 | 12/2010 |
| CN | 101497680 | 2/2011 |
| CN | 102190938 | 9/2011 |

(56) References Cited

FOREIGN PATENT DOCUMENTS

| | | |
|---|---|---|
| CN | 102190990 | 9/2011 |
| CN | 102190992 | 9/2011 |
| CN | 102250566 | 11/2011 |
| CN | 102268233 | 12/2011 |
| CN | 101717468 | 1/2012 |
| CN | 102382605 | 3/2012 |
| CN | 101717612 | 5/2012 |
| CN | 101974299 | 7/2012 |
| CN | 102226068 | 7/2012 |
| CN | 102020956 | 9/2012 |
| CN | 102070741 | 1/2013 |
| CN | 102206476 | 3/2013 |
| CN | 102344522 | 7/2013 |
| CN | 101591511 | 8/2015 |
| DE | 4 114 085 | 11/1992 |
| DE | 102005029722 | 12/2006 |
| DE | 102005041134 | 3/2007 |
| DE | 102009005517 | 7/2010 |
| EP | 0 355 982 | 2/1990 |
| EP | 0 538 173 | 4/1993 |
| EP | 0 547 834 | 6/1993 |
| EP | 0 696 516 | 2/1996 |
| EP | 0 929 602 | 7/1999 |
| EP | 1026215 | 8/2000 |
| EP | 1114734 | 7/2001 |
| EP | 1 125 169 | 8/2001 |
| EP | 1 180 436 | 2/2002 |
| EP | 1260566 | 11/2002 |
| EP | 0997314 | 12/2002 |
| EP | 1135815 | 7/2003 |
| EP | 0963857 | 2/2004 |
| EP | 0933226 | 3/2004 |
| EP | 1 520 690 | 4/2005 |
| EP | 1059379 | 2/2006 |
| EP | 1 705 219 | 9/2006 |
| EP | 1364800 | 3/2007 |
| EP | 1767341 | 3/2007 |
| EP | 1777243 | 5/2011 |
| EP | 1908798 | 8/2013 |
| JP | 60-253544 | 12/1985 |
| JP | 4-285650 | 10/1992 |
| JP | 52-14181 | 8/1993 |
| JP | 7179831 | 7/1995 |
| JP | 08-99458 | 4/1996 |
| JP | 9-503168 | 3/1997 |
| JP | 10006654 | 1/1998 |
| JP | 10-110032 | 4/1998 |
| JP | 10235815 | 9/1998 |
| JP | 10-264500 | 10/1998 |
| JP | 10305533 | 11/1998 |
| JP | 10305534 | 11/1998 |
| JP | 11198555 | 7/1999 |
| JP | 11202536 | 7/1999 |
| JP | 11315257 | 11/1999 |
| JP | 2000-071607 | 3/2000 |
| JP | 2000168018 | 6/2000 |
| JP | 2000-185459 | 7/2000 |
| JP | 2000-309160 | 11/2000 |
| JP | 2000-326622 | 11/2000 |
| JP | 2000-336327 | 12/2000 |
| JP | 2001-071631 | 3/2001 |
| JP | 2003-002923 | 1/2003 |
| JP | 2003-096140 | 4/2003 |
| JP | 2003-154612 | 5/2003 |
| JP | 2003-154748 | 5/2003 |
| JP | 2003-220670 | 8/2003 |
| JP | 2003-231226 | 8/2003 |
| JP | 2004-010661 | 1/2004 |
| JP | 2004-010662 | 1/2004 |
| JP | 2004-083787 | 3/2004 |
| JP | 2004-090330 | 3/2004 |
| JP | 2004-223811 | 8/2004 |
| JP | 2004-331899 | 11/2004 |
| JP | 2005-070686 | 3/2005 |
| JP | 2005-131930 | 5/2005 |
| JP | 2005-132032 | 5/2005 |
| JP | 2005-238694 | 9/2005 |
| JP | 2006-021354 | 1/2006 |
| JP | 2006-052298 | 2/2006 |
| JP | 2006-088349 | 4/2006 |
| JP | 2006-150653 | 6/2006 |
| JP | 2006-274220 | 10/2006 |
| JP | 2006-346885 | 12/2006 |
| JP | 2007-037900 | 2/2007 |
| JP | 2007-038677 | 2/2007 |
| JP | 2007-050620 | 3/2007 |
| JP | 2007-111867 | 5/2007 |
| JP | 2007-118584 | 5/2007 |
| JP | 2007-160746 | 6/2007 |
| JP | 2007-237438 | 9/2007 |
| JP | 2007-296827 | 11/2007 |
| JP | 2007-297569 | 11/2007 |
| JP | 2008-012716 | 1/2008 |
| JP | 2008-062611 | 3/2008 |
| JP | 2008-073871 | 4/2008 |
| JP | 2008037173 | 4/2008 |
| JP | 2008-105356 | 5/2008 |
| JP | 2008-221689 | 9/2008 |
| JP | 2008-238481 | 10/2008 |
| JP | 2009-120663 | 6/2009 |
| JP | 2009-172888 | 8/2009 |
| JP | 2010-069687 | 4/2010 |
| JP | 2010-076183 | 4/2010 |
| JP | 2010-094813 | 4/2010 |
| JP | 2010-094974 | 4/2010 |
| JP | 2010-229291 | 10/2010 |
| JP | 2010-253704 | 11/2010 |
| JP | 2010-253759 | 11/2010 |
| JP | 2010-253892 | 11/2010 |
| JP | 2010-269583 | 12/2010 |
| JP | 2011-021134 | 2/2011 |
| JP | 2011-032355 | 2/2011 |
| JP | 2011-051303 | 3/2011 |
| WO | 95-04655 | 2/1995 |
| WO | 98/04418 | 2/1998 |
| WO | 99/28791 | 6/1999 |
| WO | 00/13388 | 3/2000 |
| WO | 00/13887 | 3/2000 |
| WO | 02/31016 | 4/2002 |
| WO | 02/36353 | 5/2002 |
| WO | 02/48260 | 6/2002 |
| WO | 02/062894 | 8/2002 |
| WO | 03/016045 | 2/2003 |
| WO | 03/037614 | 5/2003 |
| WO | 03/080356 | 10/2003 |
| WO | 03/093357 | 11/2003 |
| WO | 2004/003060 | 1/2004 |
| WO | 2004/003093 | 1/2004 |
| WO | 2004/060641 | 7/2004 |
| WO | 2004/060686 | 7/2004 |
| WO | 20051068195 | 7/2005 |
| WO | 2010/005452 | 1/2010 |
| WO | 2010/062438 | 6/2010 |
| WO | 2010/091346 | 8/2010 |
| WO | 2010/129299 | 11/2010 |
| WO | 2011/037732 | 3/2011 |
| WO | 2011/109692 | 9/2011 |
| WO | 2011/146188 | 11/2011 |
| WO | 2011/091132 | 12/2011 |
| WO | 2013/033067 | 3/2013 |

OTHER PUBLICATIONS

International Search Report and Written Opinion issued in corresponding PCT/US2008/084812 dated May 19, 2009.
Dement Abstract for JP H10-110032 dated Apr. 28, 1998.
International Search Report and Written Opinion dated Oct. 24, 2012 issued in corresponding International Application No. PCT/US2012/052616.
International Preliminary Report on Patentability dated Mar. 13, 2014 issued in corresponding International Application No. PCT/US2012/052616.

(56) References Cited

OTHER PUBLICATIONS

International Search Report and Written Opinion dated Jul. 21, 2011 issued in corresponding International Application No. PCT/US2011/027154 filed Mar. 4, 2011.
International Preliminary Report on Patentability dated Nov. 4, 2012 issued in corresponding International Application No. PCT/US2011/027154 filed Mar. 4, 2011.
"Evaluation of the Residual Stability of Polyurethane Automotive Coatings by DSC," P. Simon et al., Journal of Thermal Analysis an Calorimety, vol. 84 (2006) 3, 679-692.
International Search Report dated Apr. 16, 2015 issued in corresponding International Application No. PCT/US2014/070259.
Written Opinion dated Apr. 16, 2015 issued in corresponding International Application No. PCT/US2014/070259.
International Preliminary Report on Patentability dated Jul. 14, 2016 issued in corresponding International Application No. PCT/US2014/070259.
International Search Report and Written Opinion dated Apr. 17, 2013 issued in corresponding International Application No. PCT/US2013/021205 filed Jan. 11, 2013.
International Preliminary Report on Patentability dated Jul. 24, 2014 issued in corresponding International Application No. PCT/US2013/021205 filed Jan. 11, 2013.

* cited by examiner

COMPOSITION, FILM AND RELATED METHODS

CROSS-REFERENCE TO RELATED APPLICATIONS

This application is a Continuation-In-Part of International Patent Application No. PCT/US2008/069706 filed on Jul. 10, 2008, which is incorporated herein by reference in its entirety.

FIELD OF THE INVENTION

The present invention relates to adhesive and non-adhesive articles and methods of making the same. More particularly, the articles, or films, described herein do not contain polyvinyl chloride ("PVC"). The articles can be used in a variety of applications, including for example, signs, graphics, wall covering, pressure sensitive products, and the like.

BACKGROUND OF THE INVENTION

Vinyl films plasticized with plasticizers have been used for many years in adhesive labels, tapes and decorative sheets. Vinyl films, particularly polyvinyl chloride (PVC) films, have had wide acceptance for such applications because, among other things, they are inexpensive and weather resistant and can be colored easily with pigments and dyes. In addition, plasticized polyvinyl chloride (PVC) has had particularly wide acceptance because its properties can be modified over a wide range by the incorporation of plasticizers. These films have been used in various graphic applications with success.

Although vinyl films have been useful in graphic and wall covering applications because of their superior flexibility and conformability, there is a continuing need to develop films which do not contain PVC. The halogen-containing materials such as PVC have generally been recognized as producing undesirable by-products when burned.

Accordingly, there is a need for environmentally friendly, non-PVC films that have properties that are comparable with PVC films. The present invention satisfies this need.

SUMMARY OF THE INVENTION

The present invention includes various compositions, films made from the compositions, film laminates and related methods. An exemplary embodiment is a composition that is configured for use in creating films. The composition includes vinyl acetate containing polymer and at least one additive that is a pigment, a surfactant, a dispersant, a wetting agent, a plasticizer, a defoamer, a coupling agent, a solvent, a UV absorber, a fire retardant, or a light stabilizer. A vinyl acetate containing polymer refers to vinyl acetate copolymer or homopolymer or the mixture of the two. An exemplary vinyl acetate copolymer is Vinyl Acetate Ethylene (VAE) Copolymer. The Vinyl Acetate Ethylene (VAE) Copolymer is a product based on the copolymerization of vinyl acetate and ethylene in which the vinyl acetate content can range between 60-95%, and the ethylene content ranges between 5-40% of the total formulation. This product should not be confused with the ethylene vinyl acetate (EVA) copolymers in which the vinyl acetate generally range in composition from 10-40%, and ethylene can vary between 60-90% of the formulation. VAEs are water-based emulsions, whereas EVAs are solid materials used for hot melt and plastic molding applications. VAEs are also sold in powder form, a technology pioneered in Europe.

Another exemplary embodiment of the invention includes composition comprising: an acrylic copolymer, a VAE copolymer, and additives, e.g., titanium dioxide, surfactant, dispersant, wetting agent, or defoamer. Another exemplary embodiment of the invention includes composition comprising: a hybrid of an acrylic and a VAE copolymer, and additives, e.g., titanium dioxide, surfactant, dispersant, wetting agent, or defoamer. A hybrid of an acrylic and a VAE copolymer refers to a polymer product made by seeded emulsion polymerization where an acrylic monomer is polymerized in the presence of VAE copolymer emulsion as seed latex. Another exemplary embodiment of the invention includes composition comprising: an acrylic copolymer, titanium dioxide, and additives, e.g., surfactant, dispersant, a wetting agent or defoamer. Another exemplary embodiment includes polyurethane, a blend of polyurethane and VAE copolymer, a polyurethane acrylic copolymer, a blend of polyurethane and acrylic copolymer.

In another embodiment, latex or $CaCO_3$ (calcium carbonate) can be used instead of titanium dioxide thereby making the film with same or similar opacity, but reducing the cost of the film. In one embodiment, the composition is a liquid formulation. In another embodiment, the composition is an emulsion.

Another exemplary embodiment is a film including a vinyl acetate containing polymer and at least one additive that is a pigment, a surfactant, a dispersant, a wetting agent, a plasticizer, a defoamer, a coupling agent, a solvent, a UV absorber, a fire retardant, or a light stabilizer. The film has an elongation of at least about 50%.

Another exemplary embodiment is a film including an acrylic copolymer, VAE, titanium dioxide, and at least one additive that is a surfactant, a dispersant, a wetting agent, or a defoamer.

Another exemplary embodiment is a film that includes a liner, a pressure sensitive adhesive, a strengthening layer, and a print receptive layer. The print receptive layer includes a material that is an emulsion of a blend of vinyl acetate with VAE, a VAE/acrylic hybrid, a VAE copolymer, or an acrylic formulation. In a further embodiment, the film is a graphics film.

Another exemplary embodiment is an assembly that includes a liner, a pressure sensitive adhesive, and a strengthening layer that includes a material that is a blend of cross linkable vinyl acetate copolymer with a VAE emulsion, or a polyurethane emulsion, or a blend of polyurethane containing emulsions.

One exemplary method of making the film of the present invention includes the steps of: making a composition comprising polyvinyl acetate homopolymer or copolymer, titanium dioxide, and additives; and applying the composition as a coat over a liner. The coated liner is then dried and the film peeled from the liner. In another exemplary embodiment of making the film, the composition is cast onto a polyethylene terephthalate ("PET") film.

Another exemplary method according to the invention is a method of making a film. The method includes providing components and a substrate, blending the components to form a composition, and coating the substrate with the composition. The composition includes a vinyl acetate containing polymer, and at least one additive that is a pigment, a surfactant, a dispersant, a wetting agent, a plasticizer, a defoamer, a coupling agent, a solvent, a UV absorber, a fire retardant, or a light stabilizer. In other, more detailed features of the invention, the method further includes drying the composition, and removing the dried composition from the substrate. According to a further aspect of the invention, the substrate can be a polyethylene terephthalate film.

The films of the present invention when tested for tensile strength and tensile elongation, printability by direct printing (non-impact printing) on the film specimen using solvent-based ink-jet printer, and durability in accordance with the procedures of SAE Technical Standard J1960 (Rev. October 2004) exhibit at least one of the following physical properties: tensile elongation at break of at least 100%, good printing without smudges and diffusion of ink as determined by visual inspection, and durability of 1 month to 7 years.

The non-PVC films of the present invention are weather resistant and can be colored easily with pigments and dyes. In addition, opacity can be modified by adding appropriate amount of pigments. These pigments can be included as a layer, or layers, in the film. Also, a white or gray ink wash can be used to improve the opacity of the film. The non-PVC films can be used in the manufacture of both pressure sensitive adhesive products and non-adhesive sheets and films, which include labels, tapes, banners, signage, vehicle wraps, advertising panels, and decorative sheets, and for a variety of other applications, including but not limited to applications where PVC films are generally used.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

These, as well as other features, aspects, and advantages of this invention, will be more completely understood and appreciated by referring to the following more detailed description of the presently preferred exemplary embodiments of the invention in conjunction with the accompanying drawings, of which.

Unless otherwise indicated, the illustrations in the above figures are not necessarily drawn to scale.

DETAILED DESCRIPTION OF THE INVENTION

The present invention is now illustrated in greater detail by way of the following detailed description that represents the best presently known mode of carrying out the invention. However, it should be understood that this description is not to be used to limit the present invention, but rather, is provided for the purpose of illustrating the general features of the invention.

The invention relates to composition and manufacture of polyvinyl chloride ("PVC") replacement films. The films of the present invention do not contain PVC and hence are called non-PVC films. The non-PVC films offer the advantage of being environmentally friendly and having the property of conformability, durability, or printability of PVC films. The non-PVC films of the present invention have properties and performance that are comparable to, or exceed, those of the PVC films, and are suitable for applications where PVC films are generally used, including for example, signs, graphics, wall covering, pressure sensitive products and the like.

Figure 1:
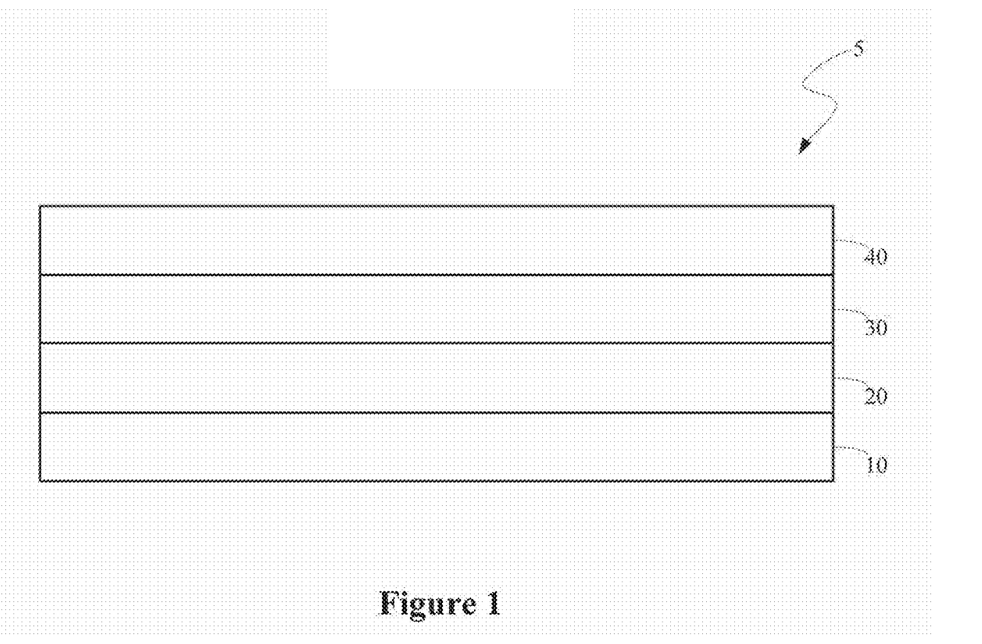
FIG. 1 is a sectional view of a film prepared in accordance with an exemplary embodiment of the present invention.

FIG. 1 is a sectional view of an exemplary film prepared in accordance with the present invention. The film is generally depicted by reference to numeral 5 and includes a release liner 10, such as a silicone coated material, a pressure sensitive adhesive layer 20, a strengthening layer 30, and a print layer 40.

The adhesive layer 20 generally can be classified into the following categories: random copolymer adhesives such as those based upon acrylate and/or methacrylate copolymers, α-olefin copolymers, silicone copolymers, chloroprene/acrylonitrile copolymers, and the like; and block copolymer adhesives including those based upon linear block copolymers (i.e., A-B and A-B-A type), branched block copolymers, star block copolymers, grafted or radial block copolymers, and the like, and natural and synthetic rubber adhesives.

A description of useful pressure-sensitive adhesives can be found in Encyclopedia of Polymer Science and Engineering, Vol. 13. Wiley-Interscience Publishers (New York, 1988). Additional descriptions of useful pressure-sensitive adhesives can be found in Encyclopedia of Polymer Science and Technology, Vol. 1, Interscience Publishers (New York, 1964).

The liner 10 is preferably an ultrathin or ultra light liner having a thickness of less than 1.02 mil (0.0255 mm), less than 1 mil (0.0254 mm), less than 0.8 mil (0.0203 mm), less than 0.6 mil (0.015 mm), less than 0.50 mil (0.013 mm), or equal to or less than 0.25 mil (0.00626 mm). Such thin liners are commercially available as HOSTAPHAN® polyester film (e.g., 0.5 mil, 0.0127 mm, Tradename 2SLK silicone coated film) sheeting from Mitsubishi Chemical Company of Tokyo Japan. Another liner material is provided by Avery Dennison Corporation of Pasadena, Calif. as a 1.02 mil (0.026 mm) polyester backing sheet with a 1.25 mil (0.032 mm) adhesive layer.

The strengthening layer 30 can include a blend of cross linkable vinyl acetate copolymer and VAE emulsions, or it can be a polyurethane containing emulsions. The print layer 40 can include in exemplary embodiments a vinyl acetate containing polymer, a blend of vinyl acetate with VAE, a VAE/acrylic hybrid, an all acrylic formulation, or a VAE emulsion.

The exemplary embodiments of composition and film 5 of the present invention include at least one of the following:
  (1) Vinyl acetate ethylene ("VAE"),
  (2) VAE-acrylic hybrid
  (3) Vinyl acetate homopolymer,
  (4) Blend of VAE and vinyl acetate homopolymer,
  (5) Blend of VAE and vinyl acetate copolymer,
  (6) Blend of VAE with polyurethane,
  (7) Blend of VAE with acrylic copolymer,
  (8) Cross linking of VAE by adding small content of silane,
  (9) Acrylic copolymer
  (10) Polyurethane containing polymer, and/or
  (11) Blend of Polyurethane and acrylic In other embodiments, a pigment, e.g., Titanium dioxide ("$TiO_2$") and/or other pigments, can be added to any of the above ten embodiments of composition and film of the present invention. The opacity of the film 5 depends on the amount of $TiO_2$ or other materials. In another embodiment, the pigment, e.g., $TiO_2$, can be replaced with latex such as ROPAQUE OP-96 or ULTRA-OPAQUE, made by Rohm and Haas of Philadelphia, Pa. In another embodiment, pigment like $TiO_2$ may not be included if a clear film is desired. In a further embodiment, CYMEL 385 by Cytec Industries Inc. of West Paterson, N.J. can be used as a cross-linker to increase the tensile strength of the film. In another embodiment used for nonprinting applications, wax emulsion, e.g., MICHEM GUARD 55 from Michelman of Cincinnati, Ohio, can be added to any of the above ten embodiments of composition and film, thereby providing the property of ease-of-cleaning to the film. In yet another embodiment, wax emulsion, e.g., MICHEM EMULSION 47950 from Michelman can be added to any of the above ten embodiments of composition and film of the present invention, and the manufactured film can be useful for anti-graffiti applications. The present invention further includes a method of making the film.

In other embodiments, the carboxyl containing components of the print layer are crosslinkable using polyaziridine, for example, XAMA-7 from Lubrizol. The hydroxy containing components are crosslinkable using polyaziridine or melamine formaldehyde, e.g. CYMEL 385 from Cytec Industries Inc. Other crosslinkers known to the skilled in the art can also be used to cross link the print layer components.

The film 5 of the present invention can be formed by preparing a liquid formulation or emulsion of an embodiment of composition of the present invention and then coating, such as by curtain coating, a substrate with the formulation or emulsion. In one embodiment, the substrate is a liner. In another embodiment, the substrate is a polyethylene terephthalate ("PET") film.

Figure 2:
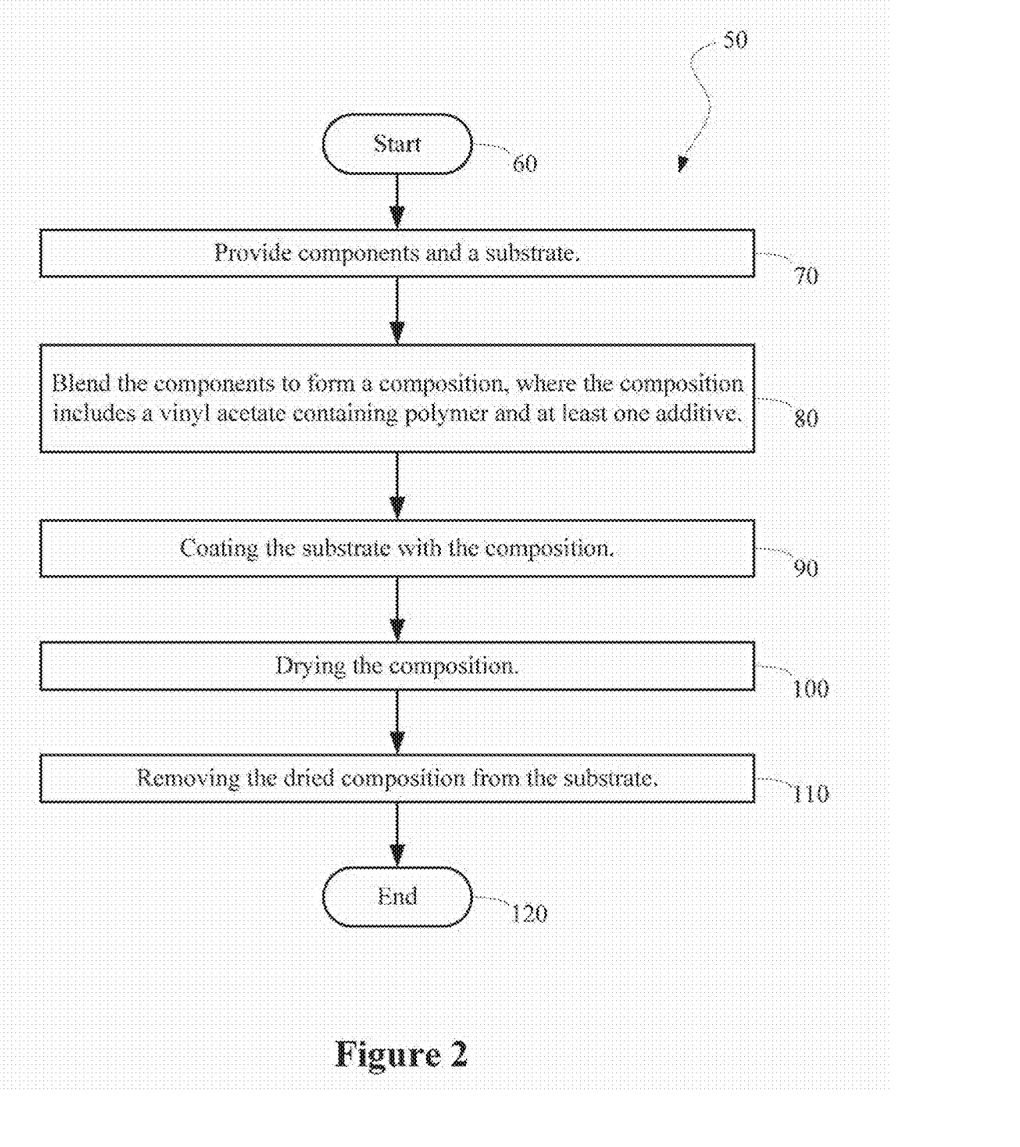
FIG. 2 is a flow diagram of a method of making a film in accordance with the present invention.

An exemplary method of making a film according to the present invention is illustrated in the flowchart 50 of FIG. 2. After starting at step 60, the next step 70 is to provide components and a substrate. Next, at step 80, the components are blended to form a composition. The composition includes a vinyl acetate containing polymer and at least one additive. Next, at step 90, the substrate is coated with the composition. At step 100, the composition is dried, and then, at step 110, the dried composition is removed from the substrate. The method ends at step 120.

In another embodiment of the film 5 of the invention, a blend of polyvinyl acetate ("PVA") and surfactant protected latex can be used to provide gloss higher than 60%. In a further embodiment, small-size latex can be used to provide higher gloss (about 75%). In another embodiment, matte or glossy film can be made by coating and then laminating with a pressure sensitive adhesive ("PSA").

In an embodiment of the method of the present invention, a dual-layered film 5 including a layer of the composition of the present invention and a layer of PSA is made using a dual-layer die coating process described in U.S. Pat. No. 5,728,430 to Sartor et al. and U.S. Pat. No. 5,558,913, et al. both of which are incorporated herein by reference in their entireties.

Adhesives can be applied to one or both major surfaces of the film 5 using known processes, such as, for example, adhesive lamination. Halogen free adhesives can be used to produce halogen-free films. Examples of halogen-free adhesives include acrylic adhesives such as a hot-melt acrylic adhesive and a water-based latex acrylic adhesive. Other halogen-free adhesives include a hot-melt rubber adhesive, a silicone adhesive, thermoplastic elastomers, other halogen-free adhesives known in the art, and any combination of any of these in any proportion.

In an exemplary embodiment of the composition of present invention, the polymeric material includes vinyl acetate containing polymer with a vinyl acetate content of at least about 75%, a pigment, and a dispersant. In yet another exemplary embodiment of the composition, the polymeric material includes a vinyl acetate containing polymer with a vinyl acetate content of at least 75%, a pigment, a plasticizer, a dispersant, a wetting agent, and an ultra-violet light ("UV") stabilizer. In other embodiments of the composition, a binder with high glass-transition temperature ("Tg") e.g., VINAC XX-230 or VINAC 890DNP by Air Products LP of Allentown, Pa., is added in varying quantities to manipulate the mechanical properties of the film 5 formed using the composition. Generally, for a polymer, higher Tg relates to higher tensile strength and lower % elongation. The mechanical properties can also be manipulated by adding plasticizer. The film of the present invention can be abrasion resistant, easy to cut, and in some cases biodegradable.

Test Methods

The properties of the composition and film 5 of the present invention can be characterized by various analytical techniques. A brief description of these analytical techniques is given below:

Tensile Elongation

The tensile elongation of the film 5 is tested using mechanical properties measurement techniques, e.g., Instron. A modified ASTM D882 was used to determine the tensile strength and percentage elongation of the films of the present invention. The procedure is as follows:
1. A 1"×4" specimen was cut out in the machine direction.
2. Grip the film 1" from the end at both the ends, so the separation between the grips is 2 inches.
3. Set the crosshead speed at 12 inches per minute ("ipm").
4. Obtain the tensile strength, which is the product of tensile stress times the thickness of the film.
5. The % elongation is reported by the machine.

The standard requires a minimum ultimate elongation of 50% and a minimum tensile strength of 0.5 pound per square inch ("psi"). The presence or absence of PSA on the film does not appreciably alter the strength and/or elongation of the film. As such, wherever the film in the examples below includes PSA, the tensile elongation test was performed using film without the layer of PSA.

Printability

The printability of the film 5 is tested by printing directly on the film specimen using solvent-based ink-jet printer. Other printing methods can include, for example, solvent screen, eco-solvent, digital, piezo ink-jet, UV screen, and UV ink-jet processes. Next, visual inspection is performed to determine if there was smudging of ink on the surface of the film and diffusion of ink inside the film. Good printing is obtained if there is no smudging and diffusion of ink.

Durability

The durability of the film 5 is tested using xenon arc weather-o-meter according to the standards of SAE J1960 (Rev. October 2004). The test method is designed to accelerate extreme environmental conditions such as sunlight, heat, and moisture (in the form of humidity, condensation, or rain) for the purpose of predicting the weatherability of the films.

EXAMPLES

The following examples describe the various embodiments of the present invention. Numerous modifications and variations within the scope of the present invention will be apparent to those skilled in the art and the present invention is not limited to the examples given below. Unless otherwise states, all parts, percentages, and ratios reported in the following examples are on a weight basis, and all reagents used in the examples were obtained, or are available, from the chemical supplier identified below, or can be synthesized by conventional techniques.

The following Table 1 provides a list of chemicals used in the following examples, identifying their supplier; function; chemical name, formula or type; percentage solids; and Tg.

TABLE 1

Materials Used in Examples

| Material Description | Supplier | Function | Chemical | % Solids | Tg °C. |
|---|---|---|---|---|---|
| KRONOS 4311 | Kronos | Pigment | TiO2 | 77 | |
| ZONYL FS-300 | Du Pont | Surfactant | Flurosurfactant | 40 | |
| TAMOL 731A | Rohm Haas | dispersant | hydrophobic copolymer | 25 | |
| AIRFLEX 465 | Air Products | Binder | VAE Emulsion | 67 | −5 |
| VINAC XX-230 | Air Products | Binder | VA Emulsion | 55 | 30 |
| AIRFLEX 323 | Air Products | Binder | VAE Emulsion | 55 | 22 |
| VINAC 890DPN | Air Products | Binder | VA copolymer | 49 | 30 |
| HYCAR 26349 | Lubrizol | Binder | Acrylic Latex | 49 | 12 |
| HYCAR 26348 | Lubrizol | Binder | Acrylic Latex | 48.5 | 30 |
| JONCRYL 617A | Johnson Polymer | Binder | Acrylic Latex | 45.5 | 7 |
| SANCURE 899 | Lubrizol | Binder | PU Emulsion | 35 | |
| BENZOFLEX 2088 | Velsicol Chemical | Plasticizer | Dipropylene Glycol dibenzoate | | |
| DREWPLUS L-198 | Ashland Inc. | Defoamer | Aliphatic Petroleum | | |
| DYNASYLAN GLYEO | Degussa | coupling agent | Silane | | |
| DYNASYLAN HYDROSIL 2926 | Degussa | coupling agent | Silane | | |
| Butyl cellusolve | Dow Chemical | solvent | | | |
| TINUVIN 1130 | Ciba | UV absorber | hydroxyphenyl benzotriazole | | |
| TINUVIN 292 | Ciba | light stabilizer | sebacate type | | |
| CYMEL 385 | Cytec Industries Inc. | Crosslinker | Melamine formaldehyde | | |
| EVOCAR LATEX DA-280 | Dow Chemical | Binder | VAE | 55 | 12 |
| TRITON X-405 | Dow Chemical | Surfactant | Octylphenol ethoxylate | 70 | |
| TRITON X-45 | Dow Chemical | Surfactant | Octylphenol ethoxylate | 100 | |
| XAMA 7 | Lubrizol | Crosslinker | Polyaziridine | 95 | |
| HYCAR 26-1265 | Lubrizol | Binder | Acrylics Ethoxylated polyol | 49 | 23 |
| DISPONIL AFX4030 | Cognis | Surfactant | Blend | 30 | |
| RHEOLATE 350 | Elementis | Thickener | Polyurethane | 50 | |
| DEV 5147 | Avery Dennison | Binder | VAE/acrylics | 60 | 12-40 |

The chemicals used in the examples are further described below.

AIRFLEX 465: A low viscosity/high solids (67%), polyvinyl alcohol protected Vinyl Acetate-ethylene ("VAE") emulsion with rapid set speed, available from Air Products.

AIRFLEX 323: Polyvinyl alcohol protected VAE emulsion, with standard solids (55%), high Tg, and excellent heat resistance, available from Air Products.

DISPONIL AFX 4030: Nonionic surfactant at with 40 moles ethylene oxide at 30% solids, available from Cognis Corporation of Cincinnati, Ohio.

VINAC XX-230: Polyvinyl alcohol protected VA emulsion, with standard solids at 55%, available from Air Products.

VINAC 890DPN: Polyvinyl acetate dispersion containing reactive groups, aluminum chloride hardener and small parts of a coalescence agent. Solids content is 49%, available from Air Products.

TAMOL 731A: A hydrophobic copolymer dispersant with excellent compatibility and good pigment wetting, available from Rohm Haas.

HYCAR 26349: Surfactant protected acrylic latex at 49% solids and 12° C. Tg, for durable coating/adhesives, available from The Lubrizol Corporation of Wickliffe, Ohio.

HYCAR 26348: Surfactant protected acrylic latex at 48.5% solids and 30° C. Tg, excellent oil and solvent resistance, available from The Lubrizol Corporation.

HYCAR 26-1265: Surfactant protected acrylic latex at 49% solids and 23° C. Tg, for ultra water resistance coating/adhesives, available from The Lubrizol Corporation.

RHEOLATE 350: A rheological additive from Elementis of London, United Kingdom.

DEV 5147: VAE/acrylic hybrid; Scale-up version of 1277-72.

SANCURE 899: An aliphatic polyester polyurethane dispersion at 30% solids, provides high gloss for coatings, available from The Lubrizol Corporation.

ZONYL FS-300: A general purpose nonionic fluorosurfactant that is an ideal wetting and leveling agent for aqueous application at 40% solids, available from DuPont of Wilmington, Del.

BENZOFLEX 2088: A dipropylene glycol dibenzoate plasticizer, available from Velsicol Chemical Corporation of Rosemont, Ill.

KRONOS 4311: An aqueous dispersion of titanium dioxide at 77% solids, available from Kronos of Houston, Tex.

JONCRYL 617A: Acrylic latex at 45.5% solids, 7° C. Tg, available from Johnson Polymer of Racine, Wis.

DREWPLUS L-198: An aliphatic petroleum defoamer, available from Ashland Inc. of Columbus, Ohio.

Butyl Cellusolve: An ethylene glycol butyl ether solvent, available from Dow Chemical of Midland, Mich.

CYMEL 385: A melamine formaldehyde cross linking agent, available from Cytec Industries Inc.

TINUVIN 1130: A UV absorber of the hydroxyphenyl benzotriazole class, available from Ciba of Basel, Switzerland.

TINUVIN 292: A liquid hindered amine light stabilizer for coating applications, available from Ciba.

DYNASYLAN GLYEO: A silane coupling agent (3-glycidyloxy-propyl-triethoxy silane), available from Degussa of Parsippany, N.J.

DYNASYLAN HYDROSOL 2926: A silane coupling agent (3-glycidyloxy-propyl-trialkoxy silane), available from Degussa.

EVOCAR LATEX DA-280: VAE latex, available from Dow Chemical.

TRITON X-405: Nonionic surfactant, available from Dow Chemical.

TRITON X-45: Nonionic surfactant, available from Dow Chemical.

XAMA 7: Polyaziridine, available from The Lubrizol Corporation.

1277-5A: Latex prepared according to Example 27A.
1277-5A: Latex prepared according to Example 27A.
1277-70: Latex prepared according to Example 28A.
1277-72A: Latex prepared according to Example 28A.
DEV-5147: Latex prepared according to Example 28A, available from Avery Dennison Corporation.

Example 1

In separate containers, the following mixtures were prepared:
A. 32.5 parts of KRONOS 4311 (25 parts dry)
B. 2.5 part of water and 0.26 part of ZONYL FS-300
C. 2.5 parts TAMOL 731A (0.6 part dry)
D. 181 parts of AIRFLEX 323 (100 parts dry)
E. 0.2 part of DREWPLUS L-198

Components A, B, and C were mixed well and added to D, and then, E was added. The blend was then coated over a 1.4 mil PET film. The resulting VAE film was then peeled off from the PET film.

Example 2

In separate containers, the following mixtures were prepared:
A. 30.8 parts of AIRFLEX 465 (20 parts dry) and 145 parts of AIRFLEX 323 (80 parts dry)
B. 2.5 part of water and 0.26 part of ZONYL FS-300
C. 19.5 parts of KRONOS 4311
D. 0.2 part of DREWPLUS L-198

Component B was mixed well and added to C, and then, the mixture was added to A under agitation, and next D was added. The resulting solids were 58%. The blend was then coated over a 2 mil PET film. The resulting VAE film was then peeled off from the PET film.

The above formulation of Example 2 was then prepared in a larger amount. The blend was coated on 2 mil PET at a 2.7 mil thickness. The coated film was then printed using a MIMAKI JV3 solvent ink jet printer available from Mimaki Engineering Co., Ltd. of Nagano, Japan. No color-to-color bleed was observed by visual inspection, and the quality of print was good.

Example 3

The composition of the formulation was the same as in Example 2. The formulation was scaled-up to a large volume and then coated in a pilot coater over 1.4 mil PET. The coated film was then laminated to a PSA with release liner. The coated film was about 1.9 mil. In other embodiments, the formulation is coated in the pilot coater over 0.92 mil PET or 2.0 mils PET. After peeling off the PET film, the gloss level was 82 and 96 at a 60 and 85 degree angle, respectively.

The same formulation was then coated using a dual die method over a release liner with VAE emulsion on the top and PSA emulsion (AROSET 3300 from Ashland Inc.) in between the VAE emulsion and the release liner. In addition to coating using a dual die method, in other embodiments, the formulation is coated using slide coating, reverse scroll, slot die, and/or curtain coating methods. In wet state, it formed a good two-layer type of coating.

Example 4

The composition of the formulation was the same as in A of Example 2, except the binder system was 30 parts dry AIRFLEX 465 and 70 parts dry AIRFLEX 323.

Example 5

The composition of the formulation was the same as in A of Example 2, except the binder system was 43 parts dry VINAC 230 and 57 parts dry AIRFLEX 323 at 20 parts BENZOFLEX 2088.

Example 6

The composition of the formulation was the same as Example 5 except VINAC 890DPN was used instead of VINAC XX-230. Also, 21 parts of BENZOFLEX 2088 were used instead of 20 parts.

Example 7

The same as Example 6 except no BENZOFLEX 2088 was used in the formulation.

Example 8

The same as Example 6 except 5 parts of BENZOFLEX 2088 were used.

Example 9

The same as Example 6 except 10 parts of BENZOFLEX 2088 were used.

Example 10

The same as Example 5 except 10 parts of BENZOFLEX 2088 were used.

Example 11

The same as Example 2 except 0.4 part of TAMOL 731A was included in the formulation. Also, 18 parts of KRONOS 4311 were used instead of 15 parts.

Example 12

The same as Example 11 except 25 parts of KRONOS 4311 were used instead of 18 parts.

Example 13

The same as Example 5 except 70 parts of AIRFLEX 323 and 30 parts of VINAC XX-230 were used instead of 57 parts of AIRFLEX 323 and 43 parts of VINAC XX-230. Also, the amount of BENZOFLEX 2088 was 5 parts instead of 20 parts.

Example 14

The same as Example 1 except 90 parts of AIRFLEX 323 and 10 parts of VINAC XX-230 were used instead of 100 parts AIRFLEX 323, respectively. Also, 0.4 part of TAMOL 731A was used instead of 0.6 part.

Example 15

The same as Example 14, except 80 parts of AIRFLEX 323 and 20 parts of VINAC XX-230 were used instead of 90 parts of AIRFLEX 323 and 10 parts of VINAC XX-230, respectively.

Example 16

The same as Example 14 except 10 parts of VINAC XX-230 were replaced by 10 parts VINAC 890DPN.

Example 17

The same as Example 15 except 20 parts of VINAC XX-230 were replaced by 20 parts of VINAC 890DPN.

Example 18

The same as Example 15 except 20 parts of VINAC XX-230 were replaced by 20 parts of HYCAR 26349.

Example 19

The same as Example 15 except 20 parts of VINAC XX-230 were replaced by 20 parts of HYCAR 26348.

Example 20

The same as Example 15 except 20 parts of VINAC XX-230 were replaced by 20 parts of JONCRYL 617A.

Example 21

The same as Example 15 except 20 parts of VINAC XX-230 were replaced by 20 parts of SANCURE 899.

Example 22

The same as Example 1 except 2 parts of DYNASYLAN GLYEO also were included in the formulation.

Example 23

The same as Example 1 except 2 parts of DYNASYLAN HYDROSIL 2926 also were included in the formulation.

Example 24

The composition of the formulation was the same as Example 4 except 2 parts of TINUVIN 1130 and 1 part of TINUVIN 292 were dissolved in 5 parts of ethylene glycol n-butyl ether (Aldrich) and added to the blend. The coated film 5 was tested using a xenon weather-o-meter for durability.

The compositions of the various formulations used in the above examples are summarized in Table 2 below. Table 3 summarizes film thickness, opacity, and mechanical properties of the coated films.

Example 25

The same as Example 15 except 80 parts of AIRFLEX 323 and 20 parts of VINAC XX-230 were replaced by 50 parts of HYCAR 26349 and 50 parts of HYCAR 26348, respectively.

Example 26

The same as Example 15, except 3 parts of CYMEL 385 were included in the formulation.

Example 27A

VAE-Acrylic Hybrid Emulsion Preparation

Following solutions are prepared:
A1: 273 gm of EVOCAR LATEX DA-280
A2: 1 gm water and 1 gm of TRITON X-405
A3: 2 gm of butyl acrylate and 6 gm of methyl methacrylate
B1: 30 gm of water, 12 gm TRITON X-405, and 0.9 gm TRITON X-45
B2: 50 gm of butyl acrylate, 100 gm methyl methacrylate, and 7.5 gm acrylic acid
C: 18 gm water and 0.6 gm of t-butyl hydrogen peroxide
D: 18 gm water, 0.6 gm sodium formaldehyde sulfoxylate, 0.1 gm TRITON X-405.

Process:
1. A1 and A2 were charged to the 1-Liter reactor and purge with nitrogen for at least 30 minutes.
2. Start agitation and add A3.
3. Make a pre-emulsion of B by adding B2 to B1 under high-shear mixing.
4. Start heating up, and at 50° C., start adding slowly C and D over 3 hours.
5. 10 minutes later, start adding slowly B over 2 hours at 55° C.
6. After the slow-adds, continue slow-adding C and D for another 30 minutes. Then cool and discharge.

The resulting latex (1277-5A) has 4.5 pH, 70 centipoise ("cps") in viscosity at 62.3% solids.

Example 27B

The formulation is the same as Example 15, except that latex 1277-5A is prepared according to Example 27A was adjusted to pH 7 by adding 7% ammonium hydroxide solution and was then used instead of AIRFLEX 323 and VINAC XX-230. Also, TAMOL 731A was not used.

Example 27C

The same as 27B except 2% XAMA 7 (polyaziridine) was included.

Example 28A

Following latexes were made with the process as Example 27. The main composition is listed below.

|  | Code | | |
|---|---|---|---|
|  | 1277-70 | 1277-72 Scale | DEV 5147 |
|  | 1L | 1L | Drum |
| Composition | | | |
| EVOCA DA280* | 100 | 100 | 100 |
| BA | 56 | 30 | 30 |
| MMA | 111 | 70 | 70 |
| AA | 8.3 | 5 | 5 |
| Physical Properties | | | |
| % Solids | 63.6 | 62 | 60.8 |
| pH | 6.9 | 7.0 | 7.5 |
| Viscosity (cps) | 220 | 42 | 1020 |

*Dry

Example 28B

In separate containers, the following mixtures were prepared:
F. 157.2 parts of 1277-70 (100 parts dry)
G. 1.5 parts of water and 1.5 parts of TRITON X-405
H. 2 part of water and 0.23 part of ZONYL FS-300
I. 1.6 parts TAMOL 731A (0.4 part dry)
J. 32.5 parts of KRONOS 4311 (25 parts dry)
K. 0.2 part of DREWPLUS L-198
L. 1 part of water and 1 part of XAMA 7

The components were added to a glass container under mixing. The blend was then coated over a 1.42 mil PET film at 2-mil thick.

Example 28C

The same as 28B except 2 parts of water and 2 parts of XAMA 7 were used in G.

Example 28D

The same as 28B except 163.4 gm of 1277-72 latex were used in A.

Example 28E

The same as 28D except 2 parts of water and 2 parts of XAMA-7 were used in G.

Printing quality of the above 4 coated films 5 (Examples 28B, C, D, E) were quite similar to the cast vinyl by a digital ink jet printer.

Example 29A

The same as Example 28B, Except 164 gm of DEV 5147 were used in A, 2.3 gm of DISPONIL AFX 4030 were used in B, and no XAMA-7 was used in G. The resulting formulation was coated over 1.42 mil PET at 1.8 mil (refer as print layer). On the top of this coated film, it was further coated with the following emulsion blends strengthening layer: 52 parts of VINAC DPN 890, 45 parts of DUR-O-SET E130, 1 part of water, and 0.3 part of ZONYL FS300 at different thickness. The coated film was dried in the 85° C. oven for 5 minutes.

Example 29B

The same as Example 29A except HYCAR 26-1265 was used instead of DEV 5147 in A and 1 part of water and 1 part of XAMA-7 were used in G. For coating purpose, 1.3 parts of RHEOLATE 350 were added to increase the coating viscosity. The resulting coating has 1.5 mils in thickness. On the top of this film, it was also coated at different thickness. The following table shows the performance.

| | Thickness (mil) | | Mechanical Properties | | | | | |
|---|---|---|---|---|---|---|---|---|
| | | | Tensile (lb/in) | | % | Young's | | |
| Example | Print layer | S.L.* | at yield | at break | Elongation at break | Modulus (Mpa) | Opacity (%) | Weeding | Digital Printing |
| 29A | 1.8 | 0.0 | 2.7 | 2.6 | 127 | 389 | 91.95 | poor | |
| | 1.8 | 0.5 | 4.6 | 4.8 | 199 | 494 | 90.61 | poor | |
| | 1.8 | 1.5 | 4.6 | 4.8 | 199 | 494 | 90.61 | marginal | good |
| | 1.8 | 1.8 | 7.7 | 8.8 | 256 | 670 | 90.90 | good | |
| 29B | 1.5 | 0.0 | 0.9 | 3.0 | 282 | 273 | 90.65 | poor | |
| | 1.5 | 0.7 | 2.6 | 5.4 | 340 | 357 | 91.09 | marginal | |
| | 1.5 | 1.0 | 3.5 | 5.2 | 260 | 417 | 91.45 | v.good | good |
| | 1.5 | 1.4 | 4.4 | 7.8 | 365 | 466 | 91.42 | good | |

*strengthening layer

The results suggest that both VAE/acrylic hybrid and acrylic base films 5 can be made at high tensile with strengthening layer. The laminate was made by laminating with PSA transfer tape with liner to the strengthening layer, and removal of the PET. The resulting laminate can be printed and weeded well.

Example 30

Examples of 30A and 30B are same composition as 29A and 29B with different thickness of the strengthening layer respectively. The results are in the Table below.

| Sample ID | Thickness (mil) print | S.L. | total | Tensile (lb/in) at yield | at break | % Elongation at break | Opacity | Gloss 60 Degree |
|---|---|---|---|---|---|---|---|---|
| 30A | 2.0 | 1.7 | 3.7 | 7.1 | 8.5 | 180 | 91.1 | 84.0 |
| 30B | 2.0 | 1.3 | 3.3 | 5.2 | 8.2 | 230 | 91.5 | 91.4 |

TABLE 2

Composition of formulations used in Examples

| Example | AIRFLEX 323 | HYCAR 26-1265 | VAE/ acrylic | AIRFLEX 465 | VINAC 230 | VINAC 890DPN | HYCAR 26348 | HYCAR 26349 | JONCRYL 617A |
|---|---|---|---|---|---|---|---|---|---|
| 1 | 100 | | | | | | | | |
| 2 | 80 | | | | 20 | | | | |
| 3 | 80 | | | | 20 | | | | |
| 4 | 70 | | | | 30 | | | | |
| 5 | 57 | | | | | 43 | | | |
| 6 | 57 | | | | | 43 | | | |
| 7 | 57 | | | | | 43 | | | |
| 8 | 57 | | | | | 43 | | | |
| 9 | 57 | | | | | 43 | | | |
| 10 | 57 | | | | | 43 | | | |
| 11 | 80 | | | | 20 | | | | |
| 12 | 80 | | | | 20 | | | | |
| 13 | 70 | | | | 30 | | | | |
| 14 | 90 | | | | 10 | | | | |
| 15 | 80 | | | | 20 | | | | |
| 16 | 90 | | | | | 10 | | | |
| 17 | 80 | | | | | 20 | | | |
| 18 | 80 | | | | | | | | |
| 19 | 80 | | | | | | 20 | | |
| 20 | 80 | | | | | | | | 20 |
| 21 | 80 | | | | | | | | |
| 22 | 100 | | | | | | | | |
| 23 | 100 | | | | | | | | |
| 24 | 70 | | | | 30 | | | | |
| 25 | | | | | | | 50 | 50 | |
| 26 | 80 | | | | 20 | | | | |
| 27B | | | | 100 | | | | | |
| 27C | | | | 100 | | | | | |
| 28B | | | | 100 | | | | | |
| 28C | | | | 100 | | | | | |
| 28D | | | | 100 | | | | | |
| 28E | | | | 100 | | | | | |
| 29A | | | | 100 | | | | | |
| 29B | | 100 | | | | | | | |
| 30A | | | | 100 | | | | | |
| 30B | | 100 | | | | | | | |

| Example | XAMA 7 | CYMEL 385 | KRONOS 4311 | TAMOL 731A | BENZOFLEX 2088 | TINUVIN 1130 | Tinuvin 292 |
|---|---|---|---|---|---|---|---|
| 1 | | | 20 | 0.6 | | | |
| 2 | | | 15 | | | | |
| 3 | | | 15 | | | | |
| 4 | | | 15 | | | | |
| 5 | | | 15 | | 20 | | |
| 6 | | | 15 | | 21 | | |
| 7 | | | 15 | | | | |
| 8 | | | 15 | | 5 | | |
| 9 | | | 15 | | 10 | | |
| 10 | | | 15 | | 10 | | |
| 11 | | | 18 | 0.4 | | | |
| 12 | | | 25 | 0.4 | | | |
| 13 | | | 15 | | 5 | | |
| 14 | | | 25 | 0.4 | | | |
| 15 | | | 25 | 0.4 | | | |
| 16 | | | 25 | 0.4 | | | |
| 17 | | | 25 | 0.4 | | | |
| 18 | | | 25 | 0.4 | | | |
| 19 | | | 25 | 0.4 | | | |
| 20 | | | 25 | 0.4 | | | |
| 21 | | | 25 | 0.4 | | | |
| 22 | | | 25 | 0.6 | | | |
| 23 | | | 25 | 0.6 | | | |

TABLE 2-continued

Composition of formulations used in Examples

| Example | | | | | | |
|---|---|---|---|---|---|---|
| 24 | | | 15 | 0.4 | 2 | 1 |
| 25 | | | 25 | 0.4 | | |
| 26 | | 3 | 25 | 0.4 | | |
| 27B | | | | | | |
| 27C | 2 | | | | | |
| 28B | 1 | | 25 | 0.4 | | |
| 28C | 2 | | 25 | 0.4 | | |
| 28D | 1 | | 25 | 0.4 | | |
| 28E | 2 | | 25 | 0.4 | | |
| 29A | 1 | | 25 | 0.4 | | |
| 29B | 1 | | 25 | 0.4 | | |
| 30A | 1 | | 25 | 0.4 | | |
| 30B | 1 | | 25 | 0.4 | | |

Note:
1. Compositions are normalized based on 100 dry binder.
2. All formulations contain about 0.26% ZONYL FS-300 and 0.2% DREWPLUS L-198 based on 100 parts dry binder

TABLE 3

Properties of films made in Examples

| Example | Coated Thickness (mil) | % Opacity | Tensile (lb/in) at Yield | % Elongation at Yield | % Elongation at Break |
|---|---|---|---|---|---|
| 1 | 2.5 | 94 | 1.7 | 22 | 260 |
| 2 | 2.8 | 92 | 1.7 | 25 | 310 |
| 3 | 1.9 | 85 | 0.9 | 25 | 380 |
| 4 | 2 | 87 | 0.7 | 26 | 280 |
| 5 | 2.75 | 91 | 0.5 | 35 | 300 |
| 6 | 2.7 | 90 | 0.4 | 48 | 366 |
| 7 | 3 | 93 | 5.3 | 10 | 237 |
| 8 | 2.8 | 91 | 2.9 | 10 | 357 |
| 9 | 3 | 93 | 2.1 | 5 | 390 |
| 10 | 3 | 93 | 1.3 | 70 | 375 |
| 11 | 2.4 | 91 | 1 | 30 | 250 |
| 12 | 2.3 | 94 | 1 | 30 | 291 |
| 13 | 2.6 | 87 | 2.1 | 15 | 312 |
| 14 | 2.3 | 92 | 1.8 | 19 | 279 |
| 15 | 2.4 | 91 | 2.2 | 15 | 237 |
| 16 | 2.2 | 92 | 1.5 | 20 | 348 |
| 17 | 2.2 | 93 | 2.1 | 19 | 191 |
| 18 | 2.1 | 94 | 1.3 | 22 | 273 |
| 19 | 2.4 | 94 | 2.1 | 8 | 140 |
| 20 | 2.3 | 94 | 1.2 | 5 | 250 |
| 21 | 2 | 90 | 0.6 | 40 | 249 |
| 22 | 2.3 | 93 | 0.7 | 25 | 395 |
| 23 | 2.3 | 93 | 1.4 | 25 | 313 |
| 24 | 2.5 | 94 | 0.4 | 50 | 365 |
| 25 | 2.1 | 94 | 4 | 5 | 65 |
| 26 | 2.3 | 93 | 3 | 11 | 210 |
| 27B | 2.3 | 96 | 2.8 | 8 | 200 |
| 27C | 2.5 | 97 | 3.6 | 8 | 150 |

All of the features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

Although the present invention has been described with reference to preferred embodiments, workers skilled in the art will recognize that changes may be made in form and detail without departing from the spirit and scope of the invention.

What is claimed is:

1. A composition that is configured for use in creating non-PVC films, the composition comprising:
    a. an emulsion polymer comprising a hybrid of a vinyl acetate ethylene (VAE) compolymer and an acrylic; and
    b. at least one additive selected from the group consisting of a pigment, a surfactant, a dispersant, a wetting agent, a plasticizer, a defoamer, a coupling agent, a solvent, a UV absorber, a fire retardant, and a light stabilizer, and
    wherein the VAE copolymer is a product based on the copolymerization of vinyl acetate and ethylene in which the vinyl acetate content ranges between 60-95%, and the ethylene content ranges between 5-40% of the total formulation.

2. The composition of claim 1, wherein the emulsion polymer is a water-based emulsion polymer.

3. A film comprising:
    a. a strengthening layer; and
    b. an ink receptive layer comprising the composition of claim 1;
    wherein the strengthening layer includes a material that is selected from the group consisting of a cross linkable vinyl acetate copolymer, a VAE emulsion, and a polyurethane emulsion or the blend thereof.

4. The film of claim 3, wherein the emulsion polymer is a water-based emulsion polymer.

5. The film of claim 3, wherein the VAE copolymer is crosslinked.

6. The film of claim 5, wherein the VAE copolymer is crosslinked with polyaziridine or melamine formaldehyde.

7. The film of claim 6, wherein the VAE copolymer is crosslinked with polyaziridine.

8. A method of making a film, comprising the steps of:
    a. coating a substrate with the composition of claim 1 to form a coated substrate.

9. The method of claim 8, wherein the emulsion polymer is a water-based emulsion polymer.

10. The method of claim 8, further comprising:
    b. drying the composition on the coated substrate; and
    c. removing the dried composition from the substrate.

11. The method of claim 8, wherein the substrate is a polyethylene terephthalate film.

12. A laminate comprising:
    a. a liner;
    b. a pressure sensitive adhesive;
    c. a strengthening layer; and
    d. an ink receptive layer;

wherein the ink receptive layer comprises the composition of claim 1.

13. The laminate of claim 12, wherein the emulsion polymer is a water-based emulsion polymer.

14. The laminate of claim 12, wherein the laminate is a graphics film.

15. The laminate of claim 12, wherein the strengthening layer includes a material that is selected from the group consisting of a cross linkable vinyl acetate copolymer, a VAE emulsion, and a polyurethane emulsion or the mixture of.

16. The composition of claim 1, wherein the pigment is $TiO_2$.

17. The composition of claim 1, wherein the at least one additive comprises $CaCO_3$.

18. The composition of claim 1, wherein the composition comprises the surfactant.

19. A non-PVC film comprising:
a. an emulsion polymer comprising a hybrid of a vinyl acetate ethylene (VAE) copolymer and an acrylic; and
b. at least one additive selected from the group consisting of a pigment, a surfactant, a dispersant, a wetting agent, a plasticizer, a defoamer, a coupling agent, a solvent, a UV absorber, a fire retardant, and a light stabilizer;
wherein the VAE copolymer is a product based on the copolymerization of vinyl acetate and ethylene in which the vinyl acetate content ranges between 60-95% and the ethylene content ranges between 5-40% of the total formulation; and
wherein the film has an ultimate elongation of at least about 50%.

20. The film of claim 19, wherein the emulsion polymer is a water-based emulsion polymer.

21. The film of claim 19, wherein the emulsion polymer is crosslinked.

22. The film of claim 21, wherein the emulsion polymer is crosslinked with polyaziridine or melamine formaldehyde.

23. The film of claim 22, wherein the emulsion polymer is crosslinked with polyaziridine.

24. The composition of claim 1, wherein the emulsion polymeris crosslinked.

25. The composition of claim 24, wherein the emulsion polymer is crosslinked with polyaziridine or melamine formaldehyde.

26. The film of claim 25, wherein the emulsion polymer is crosslinked with polyaziridine.

27. The composition of claim 1, wherein the emulsion polymer consists of the hybrid of the VAE copolymer and the acrylic; and wherein the composition consists of the emulsion polymer and the at least one additive.

28. The composition of claim 27, wherein the VAE copolymer comprises 75-95% vinyl acetate.

29. The composition of claim 27, further comprising an acrylic copolymer.

30. The composition of claim 27, further comprising a polyurethane.

31. The composition of claim 1, wherein the emulsion polymer consists of the hybrid of the VAEcopolymer and the acrylic.

\* \* \* \* \*